United States Patent Office 2,808,731
Patented Oct. 8, 1957

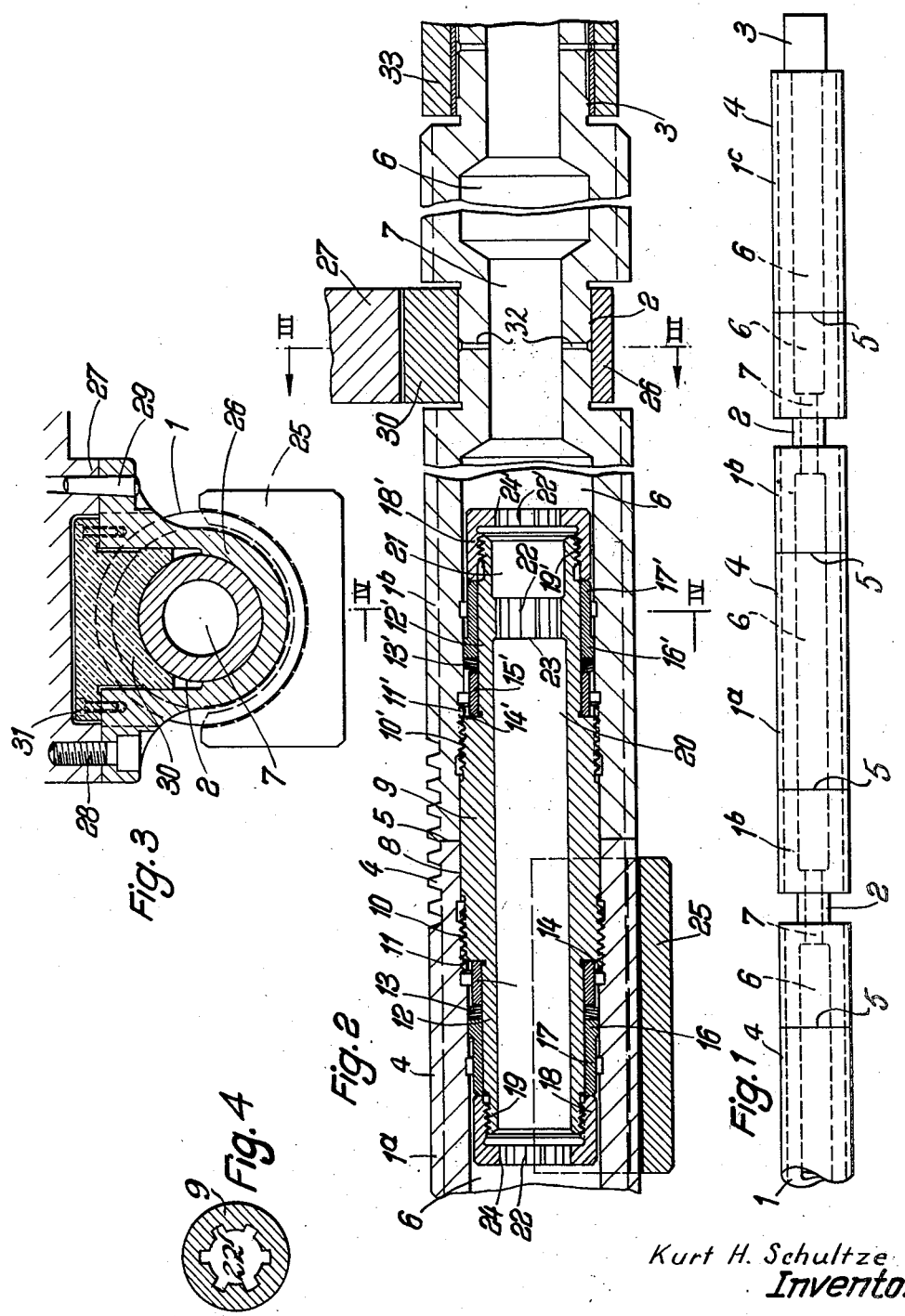
Oct. 8, 1957     K. H. SCHULTZE     2,808,731
COMPOSITE GUIDE SCREW OF SPINDLE
Filed May 18, 1956
Kurt H. Schultze
*Inventor*
ATTORNEY

2,808,731

COMPOSITE GUIDE SCREW OF SPINDLE

Kurt H. Schultze, Berlin-Frohnau, Germany, assignor to Herbert Lindner G. m. b. H., Berlin-Wittenau, Germany, a corporation of Germany Application May 18, 1956, Serial No. 585,796

Claims priority, application Germany May 28, 1955

5 Claims. (Cl. 74—424.8)

My invention relates to guide screws which are composed of a plurality of tubular components connected end to end to form a composite guide screw of great length as used as master spindles in thread cutting or grinding machines, in measuring apparatus for threaded spindles and in others.

Composite guide screws of the said type are being used in the art because the available machinery does seldom, if at all, permit the manufacture of guide screws of great length and also because guide screw components of moderate length may be manufactured more easily and more accurately.

The known composite guide screws have, however, many serious disadvantages. Mainly it was difficult to assemble the screw components in a manner to make their threads perfectly continuous and to maintain such relative position of the screw components permanently.

It is an object of my invention to overcome the said and other disadvantages as will be more fully understood from the following specification when read with the accompanying drawing in which one embodiment of my invention is illustrated.

In the drawing:

Fig. 1 shows schematically a front view of a composite guide screw including an end pivot and two intermediary journals.

Fig. 2 shows in larger scale a longitudinal cross section of my new guide screw, and Fig. 3 shows a cross sectional view along line III—III in Fig. 2, and Fig. 4 shows a cross section through an element of the guide screw more particularly referred to in the following specification.

The same reference numbers indicate the same or equivalent parts in all figures of the drawing.

As shown in Fig. 1 the guide spindle or guide screw is composed of a plurality of components 1a, 1b and 1c. Component 1a may be defined as an extension component, component 1b provided with a journal 2 as a supporting component, and component 1c provided with a pivot 3 as an end component. Only the right hand end component 1c is illustrated. The said components 1a, 1b and 1c may be combined in many different ways depending on the total length of the spindle, on the individual length of the components and on the number and location of the supporting bearings holding the journals 2. Therefore it will be well understood that the drawing shows only one of many possible combinations forming a composite guide spindle.

The thread 4 upon the components 1a, 1b, 1c of the guide spindle is only schematically indicated in Fig. 1. The said spindle components which abut with their end faces 5 are tubular having continuing axial bores 6 and 7, respectively. The neighbouring end portions of said bores 6 are preferably machined to make them tightly fit over an inserted sleeve socket 9 which centers adjoining spindle components as shown in Fig. 2.

The sleeve socket 9 illustrated in Fig. 2 has a machined central cylindrical surface 8 to fit said machined end portions of said bores 6 and is provided adjacent thereto on both sides with threaded portions 10, 10' of smaller diameter to permit to screw the same into corresponding threaded portions 11 and 11', respectively, within said bores 6. It may be advantageous to make the threads 10, 11 and 10', 11', respectively, of different pitch so that they will act as differential screws; in such case the threads of smaller pitch (for example 10, 11, assumed that the spindle is built up from right to left) will primarily be used for adjusting purposes.

The sleeve socket 9 is provided at each end with a tubular extension 12 and 12' of smaller diameter adapted to support chucking or clamping means to secure said sleeve socket within neighbouring ends of abutting spindle components and thus to effect a tight connection thereof.

In the illustrated embodiment said chucking or clamping means comprises ring shaped cup springs or locking washers 13, 13' used in singular or multiple arrangement which when compressed in axial direction will brace the sleeve socket 9 in any desired position within adjoining bores 6 of abutting spindle components. Said locking washers 13, 13' are seated upon the extensions 12, 12' between prop rings 15, 15' resting on the shoulders 14, 14' at the root of said extensions, and bushes 17, 17'. The inner edge of the innermost locking washer 13, 13' leans against said prop rings 15 or 15', respectively, and the outer edge of the outer locking washed 13, 13', leans against the collar 16 or 16', respectively, of the bushes 17, 17'. The ends of the extensions 12, 12' project from said bushes 17, 17' and are provided with a threading 19, 19' which engages cap nuts 18 and 18', respectively.

The sleeve socket 9 is provided with a ring shaped partition 22 which shows key grooves as indicated in cross section in Fig. 4. The crown of the cap nuts 18, 18' has a central opening corresponding to the central opening of the partition 22 and has identical key grooves adapted to be engaged by a corresponding operating key or spline which is inserted in axial direction into the sleeve socket 9. To make such insertion possible the outer diameter of the key engaging the said grooves has to be at least somewhat smaller than the diameter of the bores 7 passing through the journals 2 of the supporting spindle components 1b.

The composite spindle 1 is engaged by a stationary half nut 25 as shown in Fig. 3 which is rigidly mounted in the machine frame. Each of the juornals 2 of the spindle components 1b turn in a saddle like bearing 26 which suspends from the carriage 27 of the machine to which it is fastened by screws 28 and by tapered pins 29. To enclose the journal 2 completely a bearing bush 30 may supplement said bearing 26 being attached thereto by screws 31. Conventional lubricating bores 32 in the journals 2 may be used. The pinion 3 of the end component 1c rest in a conventional bearing 33.

The assembly of my new composite spindle starts with an end component 1c into which a sleeve socket 9 is so deep screwed that about one half of its central cylindrical surface 8 remains projecting. To this projecting half of the sleeve socket 9 a spindle component 1a or 1b is screwed until their opposing side faces 5 abut. The differential threading 10, 10' described above effects a very tight contact between said side faces 5 and permits an easy loosening of the assembly so that by proper tightening and loosening of the differential screw assembly the precise mutual position of the spindle components in which their screw threads are continuing, may be attained. Thereafter the cap nuts 18, 18' are tightened upon the threadings 19, 19', causing the locking washers 13 to radially expand and thus to brace the sleeve socket 9 within the ends of adjoining spindle components in a manner safe to transmit any occurring torque.

Having shown and described in detail one specific embodiment of my invention to illustrate the application of the principles of my invention, it will be well understood that the same may be otherwise embodied without departing from such principles and without avoiding the scope of the appended claims.

What I claim as my inventions is:

1. In a composite guide screw composed of tubular screw components abutting end to end, the improvement comprising in combination a sleeve socket fitting into the ends of adjoining screw components, means to axially adjust said sleeve socket within the said ends, and chucking or clamping means upon said sleeve socket to brace the same within the tubular ends of the screw components.

2. In a composite guide screw composed of tubular screw components abutting end to end, the improvement comprising in combination a sleeve socket extending into the abutting ends of adjoining screw components and with its central portion tightly fitting therein, a threading on each side of said central portion and a cooperating threading inside the end portion of each screw component, outer extensions of smaller diameter beyond said threaded portions of the sleeve socket, and chucking or clamping means mounted thereupon and adapted to brace said sleeve socket within the end portion of adjoining guide screw components.

3. In a composite guide screw composed of tubular screw components abutting end to end, the improvement comprising in combination a sleeve socket extending into the abutting ends of adjoining screw components and with its central portion tightly fitting therein, a threading on each side of said central portion and a cooperating threading inside the end portion of each screw component, outer tubular extensions of smaller diameter beyond said threaded portions of the sleeve socket, at least one ringshaped cup spring or locking washer mounted upon each of said extensions, propping means holding said locking washers in stationary position thereupon, a threaded end portion on each of said extensions and a cap nut fitting thereupon, said cap nut when tightened deforming said elastic locking washers to brace said sleeve socket within the end portions of adjoining guide screw components.

4. A composite guide screw composed of tubular screw components abutting end to end according to claim 2 wherein the threading in each side of said central portion of the sleeve socket is of different pitch so that these threadings act like a differential screw.

5. A composite guide screw composed of tubular screw components abutting end to end, according to claim 3 comprising a partition within the sleeve socket having a central opening, a conforming central opening in the crown of each cap nut, and key grooves in each of said openings adapted to be engaged by a conforming key to turn and thus to adjust the position of the sleeve socket within the ends of abutting guide screw components, and to tighten the cap nuts of effect said bracing action of the elastic locking washers, respectively.

No references cited.